United States Patent
Zhang et al.

(10) Patent No.: US 11,157,334 B2
(45) Date of Patent: Oct. 26, 2021

(54) CONTROL METHOD AND APPARATUS FOR BROADCAST SENDING, STORAGE MEDIUM, AND ELECTRONIC DEVICE

(71) Applicant: GUANGDONG OPPO MOBILE TELECOMMUNICATIONS CORP., LTD., Guangdong (CN)

(72) Inventors: Jun Zhang, Guangdong (CN); Runsheng Pei, Guangdong (CN); Liangjing Fu, Guangdong (CN); Zhiyong Lin, Guangdong (CN); Ruyu Wu, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 192 days.

(21) Appl. No.: 16/492,848

(22) PCT Filed: Oct. 18, 2017

(86) PCT No.: PCT/CN2017/106772
§ 371 (c)(1),
(2) Date: Sep. 10, 2019

(87) PCT Pub. No.: WO2018/161581
PCT Pub. Date: Sep. 13, 2018

(65) Prior Publication Data
US 2021/0149747 A1    May 20, 2021

(30) Foreign Application Priority Data
Mar. 10, 2017  (CN) .......................... 201710140802.6

(51) Int. Cl.
*G06F 9/44* (2018.01)
*G06F 9/54* (2006.01)
*G06F 9/48* (2006.01)

(52) U.S. Cl.
CPC ............ *G06F 9/542* (2013.01); *G06F 9/4818* (2013.01); *G06F 9/546* (2013.01)

(58) Field of Classification Search
CPC ..................................................... G06F 9/542
(Continued)

(56) References Cited

U.S. PATENT DOCUMENTS

2005/0271037 A1* 12/2005 Habaguchi .......... H04L 67/2823
                                                         370/351
2007/0136132 A1   6/2007 Weiser et al.
(Continued)

FOREIGN PATENT DOCUMENTS

CN    103491507 A    1/2014
CN    104994481 A    10/2015
(Continued)

OTHER PUBLICATIONS

The first examination report of the corresponding IN patent application No. 201917040432, dated Jan. 28, 2021.
(Continued)

*Primary Examiner* — Timothy A Mudrick
(74) *Attorney, Agent, or Firm* — Ladas & Parry LLP

(57) ABSTRACT

A control method for broadcast sending includes: acquiring a receiver queue corresponding to a broadcast message to be sent; determining a target receiver according to priorities of receivers in the receiver queue and a predetermined priority; and sending the broadcast message to the target receiver.

8 Claims, 6 Drawing Sheets

(58) Field of Classification Search
USPC ............................................................ 719/318
See application file for complete search history.

(56) References Cited

U.S. PATENT DOCUMENTS

| | | | |
|---|---|---|---|
| 2007/0180119 A1* | 8/2007 | Khivesara | H04L 47/828 709/226 |
| 2017/0230324 A1* | 8/2017 | Seigel | H04L 51/30 |

FOREIGN PATENT DOCUMENTS

| | | | |
|---|---|---|---|
| CN | 105141767 A | 12/2015 | |
| CN | 105357648 A | 2/2016 | |
| CN | 105528254 A | 4/2016 | |
| CN | 106201740 A | 12/2016 | |
| CN | 106326287 A | 1/2017 | |
| CN | 106936825 A | 7/2017 | |
| JP | 2010533404 A | 10/2010 | |

OTHER PUBLICATIONS

International Search Report (ISR) and Written Opinion (WO) with English translations dated Jan. 19, 2018 for Application No. PCT/CN2017/106772.
The first Office Action of the Chinese patent application No. 201710140802.6, dated Mar. 25, 2019.
The third Office Action of ths Chinese patent application No. 201710140802.6, dated Apr. 7, 2020.
Extended European Search Report in European Patent Application No. 17900056.7, dated Oct. 29, 2019.
Chinese Office Action in Chinese Patent Application No. 201710140802.6, dated Sep. 29, 2019.
The second Office Action of the Chinese patent application No. 201710140802.6, dated Sep. 29, 2019.
The rejection decision of the Chinese patent application No. 201710140802.6, dated Sep. 24, 2020.

* cited by examiner

CONTROL METHOD AND APPARATUS FOR BROADCAST SENDING, STORAGE MEDIUM, AND ELECTRONIC DEVICE

The present application is a national stage application of International Patent Application No. PCT/CN2017/106772, filed on Oct. 18, 2017, and claims priority to Chinese Patent Application No. 201710140802.6, filed in the China Patent Office on Mar. 10, 2017, entitled "Control Method and Apparatus for Broadcast Sending, and Mobile Terminal", the contents of each of which are hereby incorporated by reference in its-entirety their entireties.

TECHNICAL FIELD

The embodiments of the present application relate to an electronic device application technology, and in particular, to a control method and apparatus for broadcast sending, a storage medium, and an electronic device.

BACKGROUND

In an Android system, broadcasting is a mechanism widely used to transmit information between applications. Since the broadcast mechanism is a message subscription/publishing mechanism, each application may subscribe to a broadcast message of interest before the broadcast message is sent. When the subscribed broadcast message is published by the system, the application that has subscribed to the broadcast will receive the broadcast message and make a response according to the received broadcast message.

However, with the development of technologies, applications having various functions have gradually increased, and more and more receivers subscribe to the same broadcast message. Since too many applications need to occupy a broadcast receiver queue for the reception of broadcast messages, the response to the broadcast message is delayed, which affects the response time of the application to the broadcast message.

SUMMARY

Technical Problem

The embodiments of the present application relate to a control method and apparatus for broadcast sending, a storage medium, and an electronic device, which can increase the response speed of an application to a broadcast message.

Technical Solution

According to a first aspect, the embodiments of the present application provide a control method for broadcast sending, which may include that:

a receiver queue corresponding to a broadcast message to be sent is acquired;

a target receiver is determined according to priorities of receivers in the receiver queue and a predetermined priority; and the broadcast message is sent to the target receiver.

According to a second aspect, the embodiments of the present application further provide a control apparatus for broadcast sending, which may include:

a receiver queue acquiring module, configured to acquire a receiver queue corresponding to a broadcast message to be sent;

a target receiver determining module, configured to determine a target receiver according to priorities of receivers in the receiver queue and a predetermined priority; and a broadcast message sending module, configured to send the broadcast message to the target receiver.

According to a third aspect, the embodiments of the present application also provide a storage medium, having multiple instructions stored therein. The instructions may be adapted to be loaded by a processor to perform the above control method for broadcast sending.

According to a fourth aspect, the embodiments of the present application further provide an electronic device, which may include: a memory, a processor and a computer program that is stored on the memory and runnable on the processor, wherein the computer program is executed by the processor to implement the following operations:

a receiver queue corresponding to a broadcast message to be sent is acquired;

a target receiver is determined according to priorities of receivers in the receiver queue and a predetermined priority; and the broadcast message is sent to the target receiver.

Beneficial Effect

The embodiments of the present application relate to a control method and apparatus for broadcast sending, a storage medium, and an electronic device, which can increase the response speed of an application to a broadcast message.

DETAILED DESCRIPTION OF THE EMBODIMENTS

Figure 1:
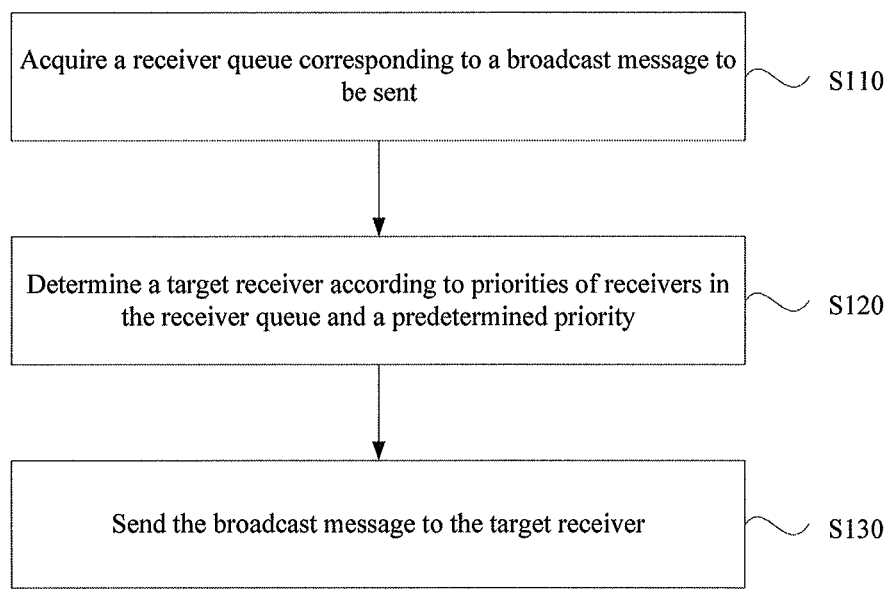
FIG. 1 is a flowchart of a control method for broadcast sending according to an embodiment of the present application.

The present application will be further described in detail below with reference to the accompanying drawings and embodiments. It will be appreciated that the specific embodiments described herein are merely illustrative of the present application and are not intended to limit the present application. In addition, it is also to be noted that, for the convenience of description, only some but not all of the structures related to the present application are shown in the drawings.

It is to be mentioned before more detailed discussions about exemplary embodiments that some exemplary embodiments are described as processing or methods described in the flowcharts. Although each operation is described into sequential processing in the flowcharts, many operations therein may be implemented in parallel, concurrently or simultaneously. In addition, a sequence of each operation may be rearranged. When the operations are completed, processing may be terminated, but there may also be additional operations not included in the drawings. Processing may correspond to a method, a function, a procedure, a subroutine, a subprogram and the like.

The embodiments of the present application provide a control method for broadcast sending, which includes the following operations:

a receiver queue corresponding to a broadcast message to be sent is acquired;

a target receiver is determined according to priorities of receivers in the receiver queue and a predetermined priority; and the broadcast message is sent to the target receiver.

In some embodiments, the operation of determining the target receiver according to the priorities of the receivers in the receiver queue and the predetermined priority includes that:

the receiver queue is sorted according to the priorities of the receivers in the receiver queue; and a receiver having a priority higher than the predetermined priority in a sorting result is determined as the target receiver.

In some embodiments, the operation of determining the target receiver according to the priorities of the receivers in the receiver queue and the predetermined priority includes that:

a number of the receivers in the receiver queue is acquired; and when the number of the receivers exceeds a set threshold, the target receiver is determined according to the priorities of the receivers in the receiver queue and the predetermined priority.

In some embodiments, the operation of determining the target receiver according to the priorities of the receivers in the receiver queue and the predetermined priority includes that:

user operation records of a plurality of receivers having a same priority are acquired;

recent usage of the plurality of receivers is sorted based on the user operation records; and the target receiver is determined according to a sorting result.

In some embodiments, the operation of acquiring user operation records of the plurality of receivers having the same priority includes that:

a switching time of each receiver is acquired, wherein the switching time is a time when the receiver is switched from a foreground operation to a background operation; and a time difference between the switching time and a current time is calculated, wherein the time difference indicates recent usage of the receiver.

Correspondingly, the operation of sorting the recent usage of the plurality of receivers based on the user operation records includes that:

the plurality of receivers having the same priority are sorted according to a numerical order of the time difference.

In some embodiments, the operation of determining the target receiver according to the priorities of the receivers in the receiver queue and the predetermined priority includes that:

a receiver having a priority lower than the predetermined priority and used recently by a user is determined as the target receiver.

In some embodiments, the operation of acquiring the receiver queue corresponding to the broadcast message to be sent includes that:

applications that subscribe to the broadcast message to be sent are acquired; and the corresponding receiver queue is generated according to the acquired applications.

FIG. 1 is a flowchart of a control method for broadcast sending according to an embodiment of the present application. The present embodiment may be applied to the case of broadcast message sending. The method may be performed by a mobile terminal, where the mobile terminal may be a smart phone, a tablet computer, or the like. As shown in FIG. 1, a control method for broadcast sending specifically includes the following operations:

S110: A receiver queue corresponding to a broadcast message to be sent is acquired.

The broadcast message includes a system broadcast message and a third-party broadcast message. The system broadcast message includes, for example, a time update broadcast message, a screen-on broadcast message, a screen-off broadcast message, a network switching broadcast message, and the like. The third-party broadcast message is a broadcast message published by a third-party application. If an application enters a certain interface, a broadcast message will be published to a broadcast management module to implement information exchange or other functions between the application and other applications under this interface.

A broadcast mechanism is a message subscription/publishing mechanism that subscribes to broadcasts of interest before the broadcast message is published by a system application or a third-party application. For example, for the network switching broadcast message, there may be 50 applications that subscribe to it. When the system publishes the network switching broadcast message, the system may first publish the broadcast message to the broadcast management module, and the broadcast management module may obtain an application subscribing to the broadcast message according to the broadcast message. In this way, the network switching broadcast message published by the system may be used as a broadcast message to be sent, applications that subscribe to the broadcast message may be used as receivers, and the receivers are represented in the form of a queue.

There are several ways to obtain the receiver queue. As an exemplary implementation, the application subscribes to the broadcast message in the broadcast management module. As another exemplary implementation, a user selection interface may be provided, and a broadcast message receiving list selected by a user is based, where the list may include receivers allowed to receive broadcast messages.

S120: A target receiver is determined according to priorities of receivers in the receiver queue and a predetermined priority.

The priority of the receiver may be the priority, which is self-defined by a system for a broadcast mechanism, for receiving the broadcast message by an application program, and the priority may be embodied in a specific level. For example, the priority of an application A is 10, and the priority of an application B is 15. The priority of the receiver may also be calling of the system according to other data parameters of the application, such as calling of a system process recycling priority. The system process recycling priority refers to an application or service that is preferentially recycled by the system when the usage of a CPU exceeds a set value to release the usage of the CPU.

For example, in the system process recycling priority, a foreground running application or a system application has the lowest priority, and the priority of the foreground running application may be 0. Correspondingly, the priority of the system application may be a negative value, such as −12. The priority of a visible application may be 1, the priority of a perceptible application may be 2, and the priority of an underlying service or other background running applications may be a larger value. When recycling according to the system process recycling priority, an application or service having the priority value higher than 2 may be preferentially recycled, thereby ensuring that the terminal can be operated normally during use.

In the embodiments of the present application, the system process recycling priority of the application may be called as the priority of the receiver. It should be noted that in the present application, an application or service having high system process recycling priority may be inverted to low priority of a receiver in an inverted manner, so the priority of a receiver of a perceptible application may be correspondingly selected in the determination of a predetermined priority, a receiver having the priority higher than that of the perceptible application serves as the target receiver, for a receiver having the priority lower than the predetermined priority, sending of a broadcast message thereto is canceled, and a manner of deleting it in a receiver queue may be adopted. Thus, influence on time of receiving a broadcast message by other receivers and making a response caused by occupying a receiver queue process can be avoided.

It is worth noting that at different times, the priorities of receivers are different due to different operating states of the system. For example, at a first moment, the application A is in a foreground running state, so for a broadcast message a, the priority of a receiver A is higher, and the application A is a target receiver. At a second moment, the application A may be in a background running state, and the priority of the broadcast message a sent at this time may be lower than the priority of the perceptible level, so for the broadcast message a at this time, the application A is not a target receiver.

The target receiver queue adjustment process may be performed when the broadcast message is generated, when the broadcast message is queued, when the broadcast message is sent, or after the broadcast message is sent. Exemplarily, as for the broadcast message a, the receiver includes ten system applications and ten third-party applications. Even if the priority of the receiver is related to the running state of the system, since the priority of the system application and some third-party applications is relatively stable, a data reference may be provided for publishing the broadcast message a or other broadcast messages again by a publisher of the broadcast message a after the broadcast message a is sent.

S130: The broadcast message is sent to the target receiver.

After the target receiver is determined, the broadcast message may be sent to the target receiver. The broadcast message may be published by a publisher to a broadcast management module, and the broadcast management module sends the broadcast message to the target receiver according to the determined target receiver queue.

According to the technical solution of the present embodiment, the priorities of receivers of a broadcast message to be sent and a predetermined priority are determined, a target receiver is determined according to a relationship between the priority of the receiver and the predetermined priority, and then a broadcast message is sent to the target receiver. The problem in the conventional art of influence on the response time of an application to a broadcast message caused by the delay response of a receiver to the broadcast message since too many applications need to occupy a broadcast receiver queue for broadcast receiving is solved, and the response speed of the application to the broadcast message can be increased.

Figure 2:
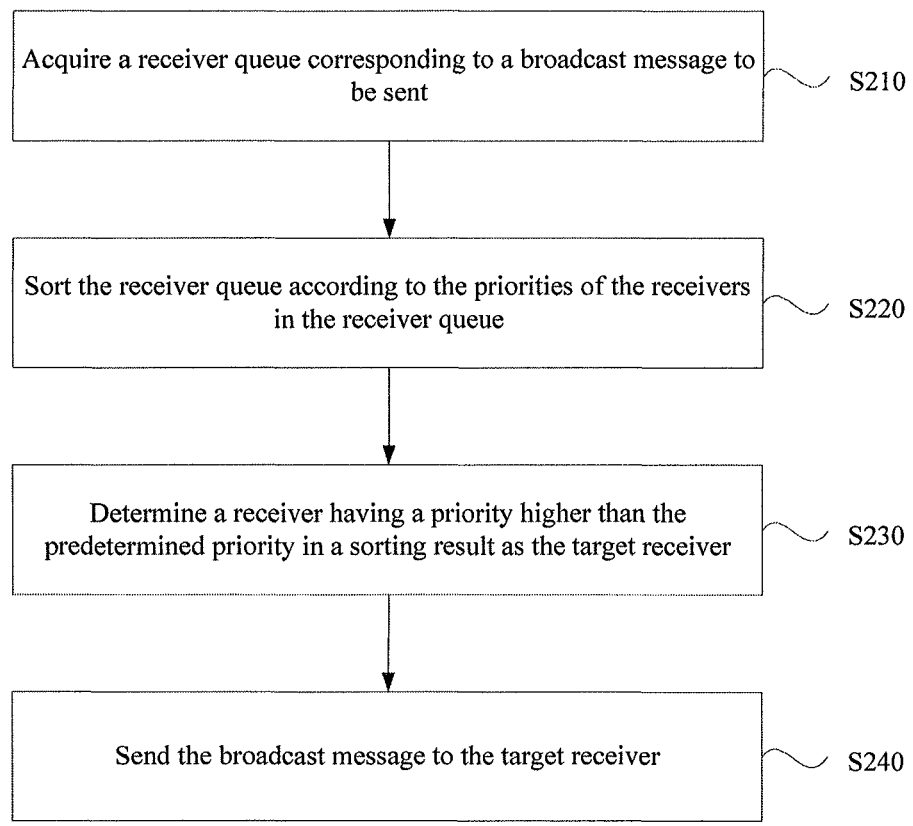
FIG. 2 is a flowchart of a control method for broadcast sending according to an embodiment of the present application.

FIG. 2 is a flowchart of a control method for broadcast sending according to an embodiment of the present application. As shown in FIG. 2, the control method for broadcast sending specifically includes the following operations:

S210: A receiver queue corresponding to a broadcast message to be sent is acquired.

S220: The receiver queue is sorted according to the priorities of the receivers in the receiver queue.

In the receiver queue, the priorities of the receivers may be partially the same. Exemplarily, the priority of receivers may include a total of 20 levels. A system application receiver may have a priority of 18-20, a foreground running receiver may have a priority of 13-15, a background running receiver may have a priority of 5-7, and a perceptible application receiver may have a priority of 10. If the system application has 20 receivers, the 20 applications may have a priority of 18-20. There may be a situation where the same priority corresponds to a plurality of receivers.

The receiver queues are sorted according to the priority of the receivers, which may be sorted in a descending order of priority. The order of the receivers of the same priority may not be limited.

S230: A receiver having a priority higher than the predetermined priority in a sorting result is determined as the target receiver.

The predetermined priority may be set after the system performs big data statistics, or may be directly set before the terminal leaves the factory. The predetermined priority may be set according to the number of applications in the terminal, or according to the average number of receivers of each broadcast message in the terminal.

In combination with the above example, the priority of the perceptible application receiver may be used as the predetermined priority, so the system application receiver having a priority higher than the predetermined priority, the foreground running receiver and the perceptible receiver may be used as target receivers. The receiver queue has been sorted according to the priority of receivers, so as long as a first receiver having a priority lower than the predetermined priority is found in the receiver queue, the receivers before the first receiver may be used as target receivers.

It should be noted that in the embodiments of the present application, the situation that the priority is higher than the predetermined priority may include a case that the priority is equal to the predetermined priority.

S240: The broadcast message is sent to the target receiver.

The present technical solution provides a method for arranging receiver queues and determining a target receiver queue based on the above technical solution. The present technical solution provides a faster selection manner for the target receiver. The speed of sending a broadcast message to the target receiver is increased.

Figure 3:
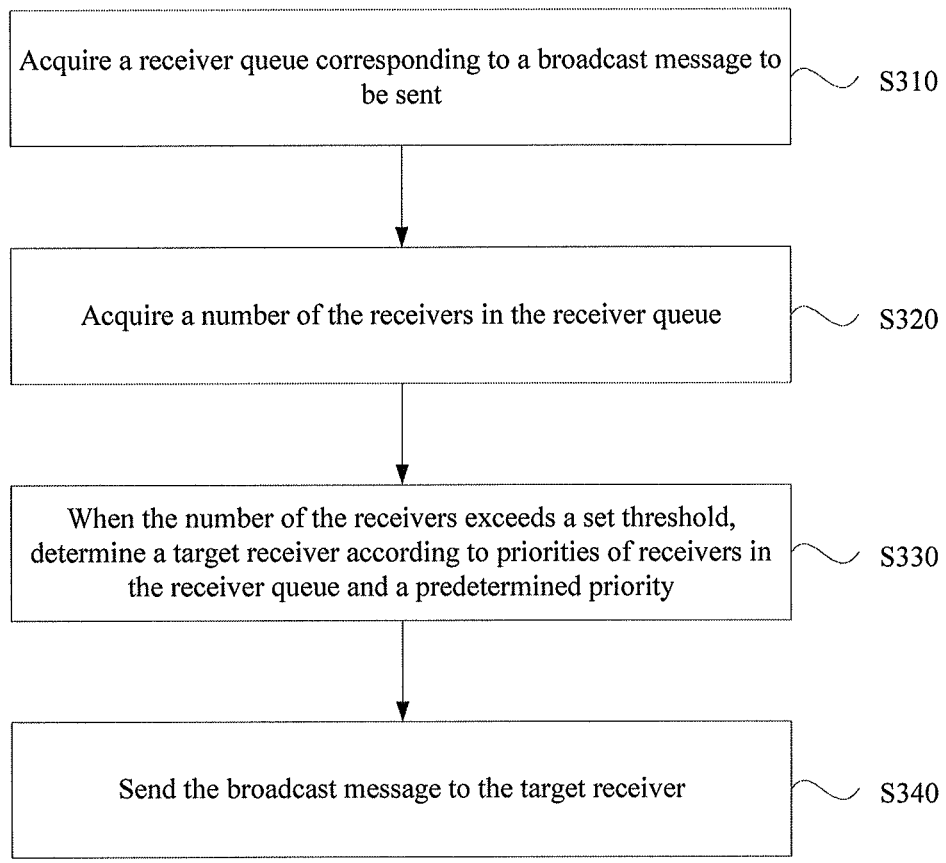
FIG. 3 is a flowchart of a control method for broadcast sending according to an embodiment of the present application.

FIG. 3 is a flowchart of a control method for broadcast sending according to an embodiment of the present application. As shown in FIG. 3, the control method for broadcast sending specifically includes the following operations:

S310: A receiver queue corresponding to a broadcast message to be sent is acquired.

S320: A number of the receivers in the receiver queue is acquired.

A receiver queue of a broadcast message to be sent is composed of an application subscribed to the broadcast message to be sent. For example, if there are 100 applications subscribed to the broadcast message to be sent, which include 50 system applications and 50 third-party applications, a number of the receivers in the receiver queue is 100.

S330: When the number of the receivers exceeds a set threshold, a target receiver is determined according to the priorities of the receivers in the receiver queue and the predetermined priority.

The set threshold may be set before the terminal is shipped from the factory, or may be set according to the operation of the terminal. In conjunction with the above example, if the set threshold is 80, the number 100 of receivers for a broadcast message a to be sent exceeds the set threshold, the target receiver is determined according to the priorities of the receivers in the receiver queue and the predetermined priority.

S340: The broadcast message is sent to the target receiver.

The present technical solution increases the dimension of a number of the receivers in the receiver queue as a reference on the basis of the above technical solutions. That is, if the number of the receivers exceeds a set threshold, a target receiver is determined according to the priority of the receiver queue and a predetermined priority. The advantage of this arrangement is to avoid that the number of receivers for a broadcast message to be sent is excessive to disable the receivers to receive and respond to the broadcast message in time.

Figure 4:
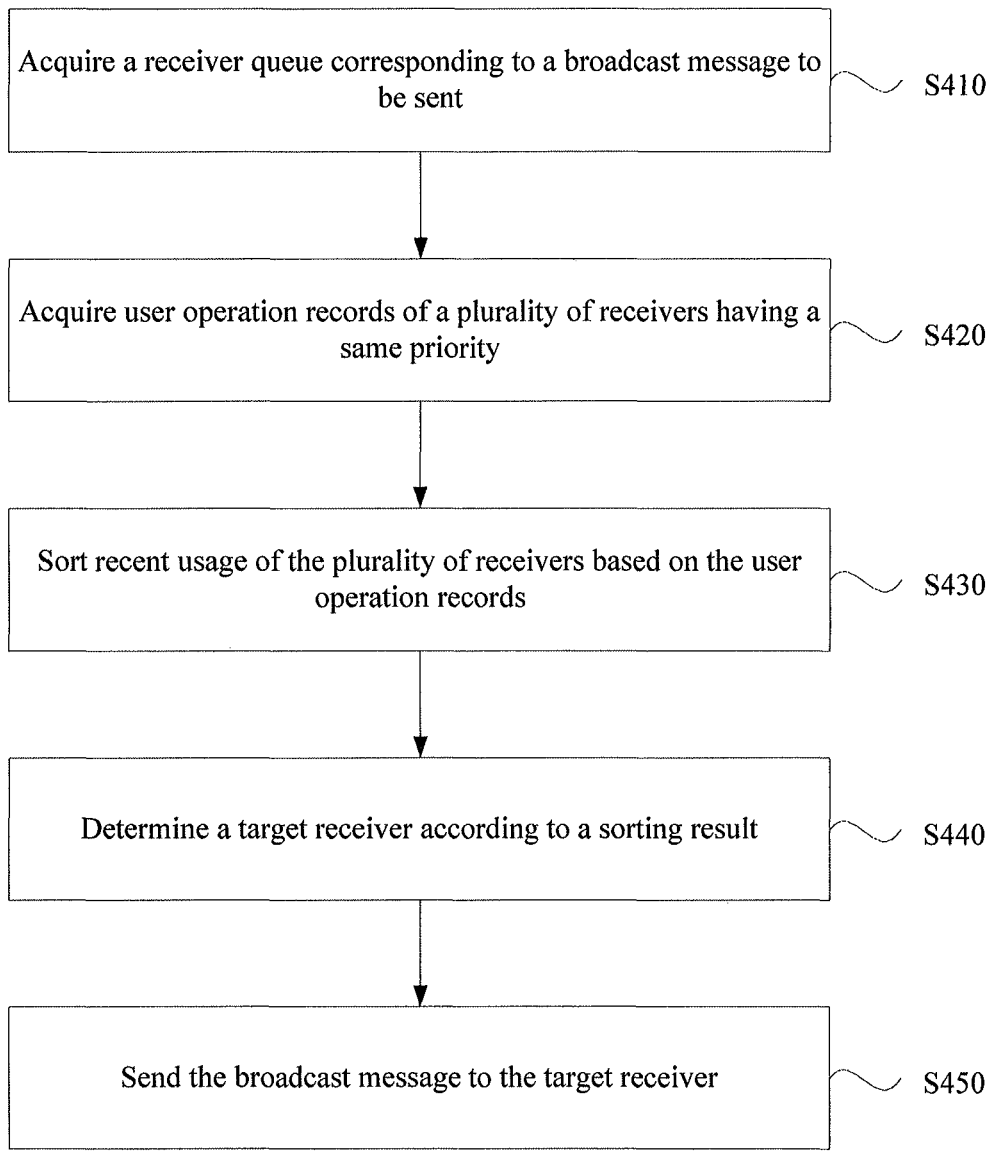
FIG. 4 is a flowchart of a control method for broadcast sending according to an embodiment of the present application.

FIG. 4 is a flowchart of a control method for broadcast sending according to an embodiment of the present application. As shown in FIG. 4, the control method for broadcast sending specifically includes the following operations:

S410: A receiver queue corresponding to a broadcast message to be sent is acquired.

S420: User operation records of a plurality of receivers having a same priority are acquired.

An operation record of an application may be called from other processes in the system. The operation record may be: records of time nodes which are able to reflect an order in which a user opens the applications, or an order in which a user closes the applications, or the applications are switched to the background.

User operation records of the plurality of receivers having the same priority are acquired after the priority of the receiver is acquired.

S430: Recent usage of the plurality of receivers is sorted based on the user operation records.

The receivers of the same priority are sorted according to the recent usage, which may be sorted in a descending order of priority. Each priority is sorted according to the recent usage, which may be sorted in an order from recent usage to long-term non-usage or never usage.

S440: The target receiver is determined according to a sorting result.

The operation of determining the target receiver according to the sorting result may be: on the basis of determining the target receiver according to the predetermined priority, sorting, according to the recent usage, receivers having a lowest priority in the determined target receiver, and canceling sending of the broadcast message to one or more receivers having a lower recent usage sorting result. It may also be that when the number of receivers subscribing to a broadcast message to be sent is large, receivers having most recent usage in each priority are used as target receivers, so that the recently used application can successfully receive the broadcast message and the number of receivers subscribing to the broadcast message to be sent can be prevented from being excessive to disable the receivers from responding to the broadcast message in time.

S450: The broadcast message is sent to the target receiver.

The present technical solution is a technical solution for sorting the receivers of each priority according to recent usage on the basis of the above technical solutions. The present technical solution has the beneficial effects that an application recently used by a user can receive a broadcast message more quickly and make a response in time.

On the basis of the above technical solution, as an exemplary implementation, the operation of acquiring user operation records of the plurality of receivers having the same priority may include that: a switching time of each receiver is acquired, wherein the switching time is a time when the receiver is switched from a foreground operation to a background operation; and a time difference between the switching time and a current time is calculated, wherein the time difference indicates recent usage of the receiver. Correspondingly, the operation of sorting the recent usage of the plurality of receivers based on the user operation records may include that: the plurality of receivers having the same priority are sorted according to a numerical order of the time difference. The advantage of this setting is that a data basis for judging the recent usage is provided, the time when an application is switched from foreground running to background running is used as the data basis, and then an order for sorting according to the recent usage of the application may be determined according to a difference between a switching time and a current time, that is, a time difference. Moreover, a time difference threshold may also be set for the time difference to determine the recent use of the application, and a target broadcast receiver may be provided with accurate reference information.

Figure 5:
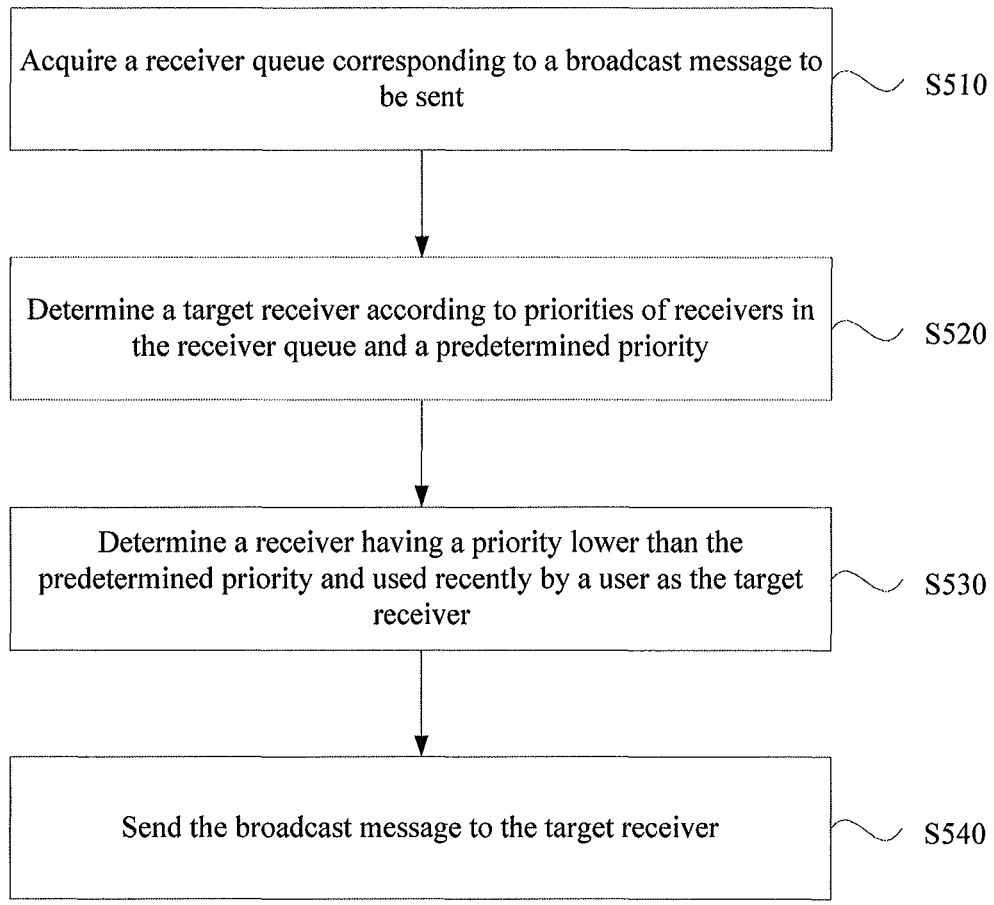
FIG. 5 is a flowchart of a control method for broadcast sending according to an embodiment of the present application.

FIG. 5 is a flowchart of a control method for broadcast sending according to an embodiment of the present application. As shown in FIG. 5, the control method for broadcast sending specifically includes the following operations:

S510: A receiver queue corresponding to a broadcast message to be sent is acquired.

S520: A target receiver is determined according to priorities of receivers in the receiver queue and a predetermined priority.

S530: A receiver having a priority lower than the predetermined priority and used recently by a user is determined as the target receiver.

Receivers recently used by a user may be applications of interest to the user or applications for the user to be accustomed to run and view. After the target receiver having a priority higher than the predetermined priority is determined, a receiver recently used by the user may be acquired from receivers having a priority lower than the predetermined priority and determined as the target receiver. The receiver recently used by the user may include a background running application, or an application logged out after being recently used by the user.

S540: The broadcast message is sent to the target receiver.

The present technical solution provides a method for extracting a receiver having the priority lower than a predetermined priority as the target receiver, that is, selecting the receiver according to the recent usage of a user. The advantage of this arrangement is to ensure that an application recently used by the user can receive a broadcast message and make a response.

The embodiments of the present application further provide a control apparatus for broadcast sending, which includes a receiver queue acquiring module, a target receiver determining module and a broadcast message sending module.

The receiver queue acquiring module is configured to acquire a receiver queue corresponding to a broadcast message to be sent.

The target receiver determining module is configured to determine the target receiver according to the priorities of the receivers in the receiver queue and the predetermined priority.

The broadcast message sending module is configured to send the broadcast message to the target receiver.

In some embodiments, the target receiver determining module includes a receiver queue sorting unit and a first target receiver determining unit.

The receiver queue sorting unit is configured to sort the receiver queue according to the priorities of the receivers in the receiver queue.

The first target receiver determining unit is configured to determine a receiver having a priority higher than the predetermined priority in a sorting result as the target receiver.

In some embodiments, the target receiver determining module includes a receiver number acquiring unit and a second target receiver determining unit.

The receiver number acquiring unit is configured to acquire a number of the receivers in the receiver queue.

The second target receiver determining unit is configured to determine, when the number of the receivers exceeds a set threshold, the target receiver according to the priorities of the receivers in the receiver queue and the predetermined priority.

In some embodiments, the target receiver determining module includes a user operation record acquiring unit, a same-priority receiver sorting unit and a third target receiver determining unit.

The user operation record acquiring unit is configured to acquire user operation records of a plurality of receivers having a same priority.

The same-priority receiver sorting unit is configured to sort recent usage of the plurality of receivers based on the user operation records.

The third target receiver determining unit is configured to determine the target receiver according to a sorting result.

In some embodiments, the user operation record acquiring unit includes a switching time acquiring subunit and a time difference calculating subunit.

The switching time acquiring subunit is configured to acquire a switching time of each receiver, wherein the switching time is a time when the receiver is switched from a foreground operation to a background operation.

The time difference calculating subunit is configured to calculate a time difference between the switching time and a current time, wherein the time difference indicates recent usage of the receiver.

Correspondingly, the same-priority receiver sorting unit includes a same-priority receiver sorting subunit.

The same-priority receiver sorting subunit is configured to sort the plurality of receivers having the same priority according to a numerical order of the time difference.

In some embodiments, the target receiver determining module specifically includes a low-priority target receiver determining module.

The low-priority target receiver determining module is configured to determine a receiver having a priority lower than the predetermined priority and used recently by a user as the target receiver.

In some embodiments, the receiver queue acquiring module is specifically configured to:
acquire applications that subscribe to the broadcast message to be sent; and
generate the corresponding receiver queue according to the acquired applications.

Figure 6:
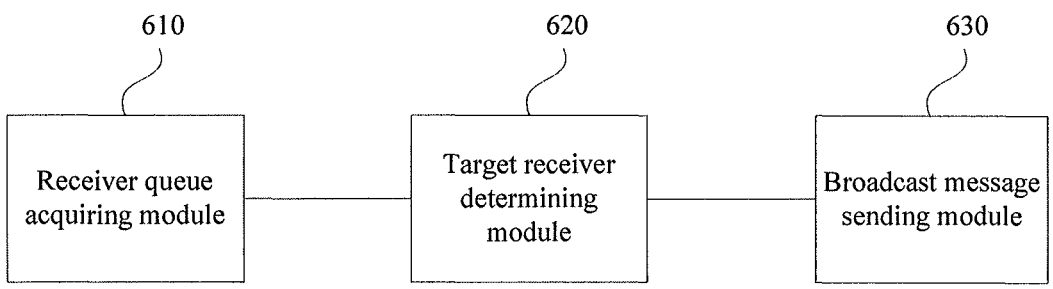
FIG. 6 is a structural diagram of a control apparatus for broadcast sending according to an embodiment of the present application.

FIG. 6 is a structural diagram of a control apparatus for broadcast sending according to an embodiment of the present application. The apparatus may be configured in an electronic device such as a mobile terminal. As shown in FIG. 6, the control apparatus for broadcast sending includes a receiver queue acquiring module 610, a target receiver determining module 620 and a broadcast message sending module 630.

The receiver queue acquiring module 610 is configured to acquire a receiver queue corresponding to a broadcast message to be sent.

The target receiver determining module 620 is configured to determine the target receiver according to the priorities of the receivers in the receiver queue and the predetermined priority.

The broadcast message sending module 630 is configured to send the broadcast message to the target receiver.

According to the technical solution of the present embodiment, the priority of a receiver of a broadcast message to be sent and a predetermined priority are determined, a target receiver is determined according to a relationship between the priority of the receiver and the predetermined priority, and then a broadcast message is sent to the target receiver. The problem in the conventional art of influence on the response time of an application to a broadcast message caused by the delay response of a receiver to the broadcast message since too many applications need to occupy a broadcast receiver queue for broadcast receiving is solved, and the response speed of the application to the broadcast message can be increased.

On the basis of the above technical solution, the target receiver determining module 620 includes a receiver queue sorting unit and a first target receiver determining unit.

The receiver queue sorting unit is configured to sort the receiver queue according to the priorities of the receivers in the receiver queue.

The first target receiver determining unit is configured to determine a receiver having a priority higher than the predetermined priority in a sorting result as the target receiver.

On the basis of the above technical solution, the target receiver determining module 620 includes a receiver number acquiring unit and a second target receiver determining unit.

The receiver number acquiring unit is configured to acquire a number of the receivers in the receiver queue.

The second target receiver determining unit is configured to determine, when the number of the receivers exceeds a set threshold, the target receiver according to the priorities of the receivers in the receiver queue and the predetermined priority.

On the basis of the above technical solution, the target receiver determining module 620 includes a user operation record acquiring unit, a same-priority receiver sorting unit and a third target receiver determining unit.

The user operation record acquiring unit is configured to acquire user operation records of a plurality of receivers having a same priority.

The same-priority receiver sorting unit is configured to sort recent usage of the plurality of receivers based on the user operation records.

The third target receiver determining unit is configured to determine the target receiver according to a sorting result.

On the basis of the above technical solution, the user operation record acquiring unit includes a switching time acquiring subunit and a time difference calculating subunit.

The switching time acquiring subunit is configured to acquire a switching time of each receiver, wherein the switching time is a time when the receiver is switched from a foreground operation to a background operation.

The time difference calculating subunit is configured to calculate a time difference between the switching time and a current time, wherein the time difference indicates recent usage of the receiver.

Correspondingly, the same-priority receiver sorting unit includes a same-priority receiver sorting subunit.

The same-priority receiver sorting subunit is configured to sort the plurality of receivers having the same priority according to a numerical order of the time difference.

On the basis of the above technical solution, the target receiver determining module 620 specifically includes a low-priority target receiver determining module.

The low-priority target receiver determining module is configured to determine a receiver having a priority lower than the predetermined priority and used recently by a user as the target receiver.

The above products may perform any method provided by the embodiments of the present application, and have the corresponding functional modules and beneficial effects for performing the method.

Figure 7:
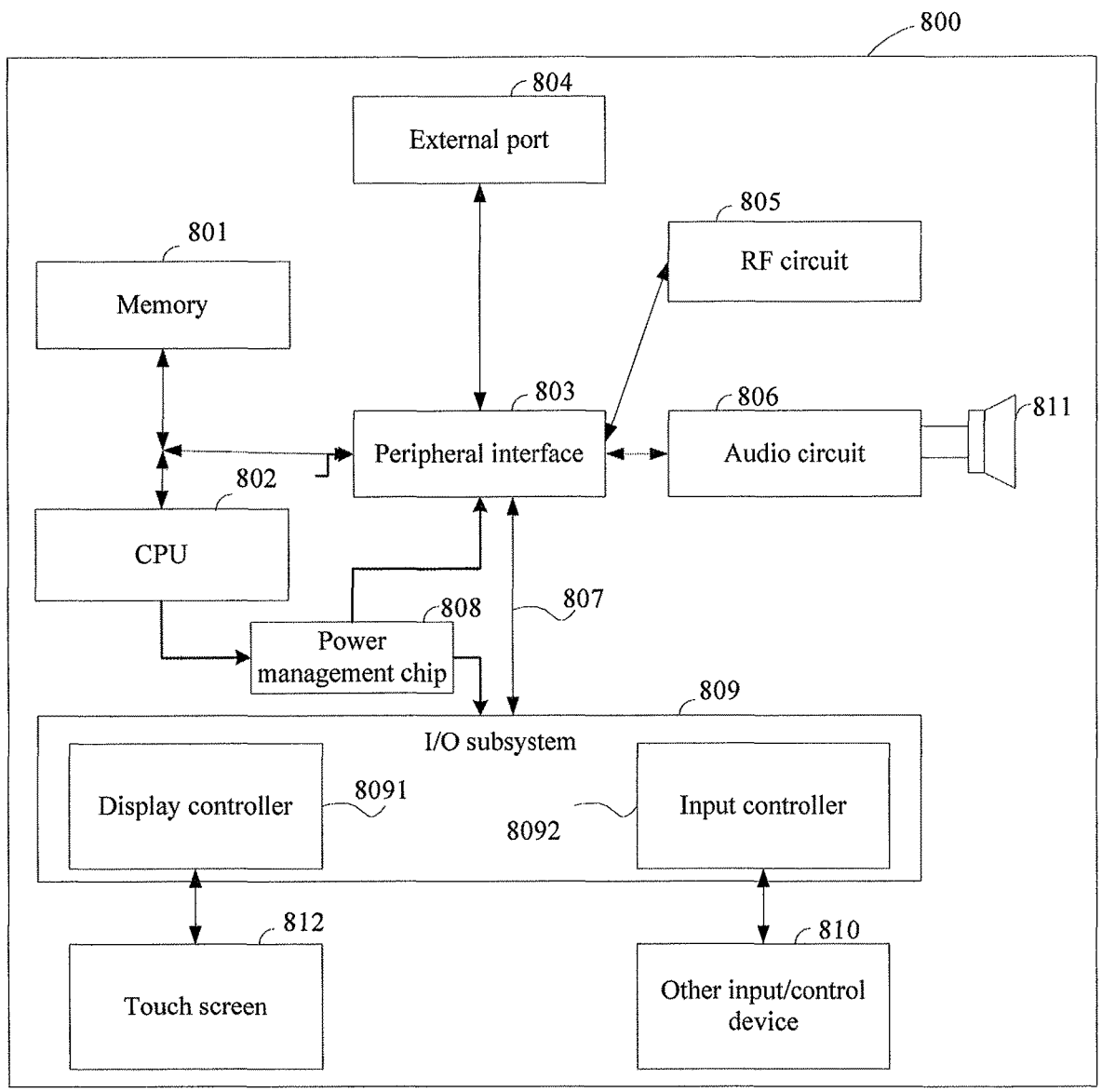
FIG. 7 is a structural diagram of a mobile terminal according to an embodiment of the present application.

The embodiments of the present application also provide an electronic device. The electronic device may be a smart phone, a tablet computer or other mobile terminals. FIG. 7 is a structural diagram of a mobile terminal according to an embodiment of the present application. As shown in FIG. 7, the mobile terminal 800 may include: a housing (not shown), a memory 801, a Central Processing Unit (CPU) 802 (also called as a processor), a computer program that is stored on the memory 801 and is runnable on the processor 802, a circuit board (not shown), and a power circuit (not shown). The circuit board is disposed inside a space defined by the housing. The CPU 802 and the memory 801 are disposed on the circuit board. The power circuit is configured to supply power to various circuits or devices of the mobile terminal. The memory 801 is configured to store executable program codes. The CPU 802 runs programs corresponding to the executable program codes by reading the executable program codes stored in the memory 801 to perform the following operations:

a receiver queue corresponding to a broadcast message to be sent is acquired;

a target receiver is determined according to priorities of receivers in the receiver queue and a predetermined priority; and the broadcast message is sent to the target receiver.

The mobile terminal further includes: a peripheral interface 803, a Radio Frequency (RF) circuit 805, an audio circuit 806, a speaker 811, a power management chip 808, an Input/Output (I/O) subsystem 809, a touch screen 812, another input/control device 810 and an external port 804, and these components communicate through one or more communication buses or signal wires 807.

It is to be understood that the mobile terminal 800 shown in the figure is only an example of the mobile terminal, the mobile terminal 800 may have more or fewer components than those shown in the figure, two or more components may be combined or different component configurations may be made. Each component shown in the figure may be implemented in hardware including one or more signal processing and/or application specific integrated circuits, software or a combination of the hardware and the software.

A mobile terminal provided by the present embodiment for implementing a function of controlling broadcast sending will be described below in detail. For example, the mobile terminal is a mobile phone.

The memory 801: the memory 801 may be accessed by the CPU 802, the peripheral interface 803 and the like, and the memory 801 may include a high-speed Random Access Memory (RAM) and may further include a nonvolatile memory, for example, one or more disk storage devices, flash memories or other nonvolatile solid-stage storage devices.

The peripheral interface 803: the peripheral interface 803 may connect I/O peripherals of the device to the CPU 802 and the memory 801.

The I/O subsystem 809: the I/O subsystem 809 may connect the I/O peripherals of the device, for example, the touch screen 812 and the other input/control device 810 to the peripheral interface 803. The I/O subsystem 809 may include a display controller 8091 and one or more input controllers 8092 configured to control the other input/control device 810. Herein, the one or more input controllers 8092 receive electric signals from the other input/control device 810 or send electric signals to the other input/control device 810, and the other input/control device 810 may include a physical button (a pressing button and a rocker arm button), a dial, a slide switch, a joystick and a click roller. It is to be noted that the input controller 8092 may be connected with any one of a keyboard, an infrared port, a Universal Serial Bus (USB) interface and an indication device such as a mouse.

According to the working principle of a touch screen and a medium for transmitting information, the touch screen 812 may be a resistive, capacitive inductive, infrared or surface acoustic wave type. According to the installation manner, the touch screen 812 may be external, built-in or integrated. According to the technical principle, the touch screen 812 may be: a vector pressure sensing technology touch screen, a resistive technology touch screen, a capacitive technology touch screen, an infrared technology touch screen or a surface acoustic wave technology touch screen.

The touch screen 812: the touch screen 812 is an input interface and output interface between the user terminal and the user and displays visual output to the user, and the visual output may include a graph, a text, an icon, a video and the like. As an exemplary implementation, the touch screen 812 sends an electrical signal (such as an electrical signal of a contact surface) triggered by a user on the touch screen to the processor 802.

The display controller 8091 in the I/O subsystem 809 receives an electric signal from the touch screen 812 or sends an electric signal to the touch screen 812. The touch screen 812 detects a contact on the touch screen, the display controller 8091 converts the detected contact into interaction with a user interface object displayed on the touch screen 812 to implement human-computer interaction, and the user interface object displayed on the touch screen 812 may be an icon of a running game, an icon of connection to a corresponding network and the like. It is to be noted that the device may further include an optical mouse, and the optical mouse is a touch-sensitive surface which does not display visual output or an extension of a touch-sensitive surface formed by the touch screen.

The RF circuit 805 is mainly configured to establish communication between the mobile phone and a wireless network (i.e., a network side) to implement data receiving and sending between the mobile phone and the wireless network, for example, receiving and sending of a short message and an electronic mail.

The audio circuit 806 is mainly configured to receive audio data from the peripheral interface 803, convert the audio data into an electric signal and send the electric signal to the speaker 811.

The speaker 811 is configured to restore a voice signal received from the wireless network by the mobile phone through the RF circuit 805 into a sound and play the sound to the user.

The power management chip 808 is configured to perform power supply and power management on the CPU 802, the I/O subsystem and hardware connected with the peripheral interface.

In the present embodiment, the CPU 802 is configured to:

acquire a receiver queue corresponding to a broadcast message to be sent;

determine a target receiver according to priorities of receivers in the receiver queue and a predetermined priority; and send the broadcast message to the target receiver.

Further, when determining the target receiver according to the priorities of the receivers in the receiver queue and the predetermined priority, the computer program is executed by the processor 802 to implement the following operations:

the receiver queue is sorted according to the priorities of the receivers in the receiver queue; and a receiver having a priority higher than the predetermined priority in a sorting result is determined as the target receiver.

Further, when determining the target receiver according to the priorities of the receivers in the receiver queue and the predetermined priority, the computer program is executed by the processor 802 to implement the following operations:

a number of the receivers in the receiver queue is acquired; and when the number of the receivers exceeds a set threshold, the target receiver is determined according to the priorities of the receivers in the receiver queue and the predetermined priority.

Further, when determining the target receiver according to the priorities of the receivers in the receiver queue and the predetermined priority, the computer program is executed by the processor 802 to implement the following operations:

user operation records of a plurality of receivers having a same priority are acquired;

recent usage of the plurality of receivers is sorted based on the user operation records; and the target receiver is determined according to a sorting result.

Further, when acquiring user operation records of the plurality of receivers having the same priority, the computer program is executed by the processor 802 to implement the following operations:

a switching time of each receiver is acquired, wherein the switching time is a time when the receiver is switched from a foreground operation to a background operation; and a time difference between the switching time and a current time is calculated, wherein the time difference indicates recent usage of the receiver.

Correspondingly, the operation of sorting the recent usage of the plurality of receivers based on the user operation records includes that:

the plurality of receivers having the same priority are sorted according to a numerical order of the time difference.

Further, when determining the target receiver according to the priorities of the receivers in the receiver queue and the predetermined priority, the computer program is executed by the processor 802 to implement the following operations:

a receiver having a priority lower than the predetermined priority and used recently by a user is determined as the target receiver.

Further, when acquiring the receiver queue corresponding to the broadcast message to be sent, the computer program is executed by the processor 802 to implement the following operations:

applications that subscribe to the broadcast message to be sent are acquired; and the corresponding receiver queue is generated according to the acquired applications.

It is to be noted that the mobile terminal 800 may further include a camera, a Bluetooth module, and the like, and details are not described herein.

The embodiment of the present application also provides a storage medium, having multiple instructions stored therein. The instructions may be adapted to be loaded by a processor to perform any of the above control method for broadcast sending.

It will be understood by those of ordinary skill in the art that all or part of the operations of the various methods in the above embodiments may be completed by instructing related hardware through programs, which may be stored in a computer-readable storage medium. The storage medium may include: a Read Only Memory (ROM), a RAM, a magnetic disk or an optical disk.

It is noted that the above are only the preferred embodiments of the present application and the technical principles applied thereto. Those skilled in the art will appreciate that the present application is not limited to the specific embodiments described herein, and various obvious changes, re-adjustments and substitutions may be made by those skilled in the art without departing from the scope of protection of the present application. Therefore, the present application has been described in detail by the above embodiments, but the present application is not limited to the above embodiments, and more other equivalent embodiments may be included without departing from the concept of the present application. The scope of the present application is determined by the scope of the appended claims.

What is claimed is:

1. A control method for broadcast sending, comprising:
    acquiring a receiver queue corresponding to a broadcast message to be sent;
    determining a target receiver according to a priority of each receiver in the receiver queue and a predetermined priority; and
    sending the broadcast message to the target receiver;
  wherein determining the target receiver according to the priority of each receiver in the receiver queue and the predetermined priority comprises:
    acquiring user operation records of a plurality of receivers having a same priority;
    sorting recent usage of the plurality of receivers based on the user operation records; and
    determining the target receiver according to a sorting result;

wherein acquiring the user operation records of the plurality of receivers having the same priority comprises:
    acquiring a switching time of each receiver, wherein the switching time is a time when the receiver is switched from a foreground operation to a background operation; and
    calculating a time difference between the switching time and a current time, wherein the time difference indicates recent usage of the receiver;
wherein sorting the recent usage of the plurality of receivers based on the user operation records comprises:
    sorting the plurality of receivers having the same priority according to a numerical order of the time difference.

2. The control method for broadcast sending as claimed in claim 1, wherein acquiring the receiver queue corresponding to the broadcast message to be sent comprises:
    acquiring applications that subscribe to the broadcast message to be sent; and
    generating the receiver queue corresponding to the broadcast message according to the acquired applications.

3. A storage medium, having a plurality of instructions stored therein, the instructions being adapted to be loaded by a processor to perform operations of:
    acquiring a receiver queue corresponding to a broadcast message to be sent;
    determining a target receiver according to a priority of each receiver in the receiver queue and a predetermined priority; and
    sending the broadcast message to the target receiver;
wherein determining the target receiver according to the priority of each receiver in the receiver queue and the predetermined priority comprises:
    acquiring user operation records of a plurality of receivers having a same priority;
    sorting recent usage of the plurality of receivers based on the user operation records; and
    determining the target receiver according to a sorting result;
wherein acquiring the user operation records of the plurality of receivers having the same priority comprises:
    acquiring a switching time of each receiver, wherein the switching time is a time when the receiver is switched from a foreground operation to a background operation; and
    calculating a time difference between the switching time and a current time, wherein the time difference indicates recent usage of the receiver;
wherein sorting the recent usage of the plurality of receivers based on the user operation records comprises:
    sorting the plurality of receivers having the same priority according to a numerical order of the time difference.

4. An electronic device, comprising:
    a memory, a processor and a computer program that is stored on the memory and runnable on the processor, wherein the computer program is executed by the processor to implement the following operations:
    acquiring a receiver queue corresponding to a broadcast message to be sent;
    determining a target receiver according to a priority of each receiver in the receiver queue and a predetermined priority; and
    sending the broadcast message to the target receiver;
wherein determining the target receiver according to the priority of each receiver in the receiver queue and the predetermined priority comprises:
    acquiring user operation records of a plurality of receivers having a same priority;
    sorting recent usage of the plurality of receivers based on the user operation records; and
    determining the target receiver according to a sorting result;
wherein acquiring the user operation records of the plurality of receivers having the same priority comprises:
    acquiring a switching time of each receiver, wherein the switching time is a time when the receiver is switched from a foreground operation to a background operation; and
    calculating a time difference between the switching time and a current time, wherein the time difference indicates recent usage of the receiver;
wherein sorting the recent usage of the plurality of receivers based on the user operation records comprises:
    sorting the plurality of receivers having the same priority according to a numerical order of the time difference.

5. The control method for broadcast sending as claimed in claim 1, wherein the priority of each receiver in the receiver queue are priorities defined by a system for a broadcast mechanism or system process recycling priorities of applications; and a priority of a perceptible application receiver is used as the predetermined priority.

6. The control method for broadcast sending as claimed in claim 1, wherein the user operation records of the plurality of receivers comprises:
    records of time nodes which reflect an order of a user opens applications, closes applications, or switches applications to run in the background.

7. The control method for broadcast sending as claimed in claim 1, wherein determining the target receiver according to the sorting result comprises:
    on a basis of determining the target receiver according to the predetermined priority, sorting, according to the recent usage, receivers having a lowest priority in the determined target receiver, and canceling sending of the broadcast message to one or more receivers having a lower recent usage sorting result; or,
    using one or more receivers having most recent usage in each priority as the target receiver.

8. The electronic device as claimed in claim 4, wherein in acquiring the receiver queen corresponding to the broadcast message to be sent, the computer program is executed by the processor to implement the following operations:
    acquiring applications that subscribe to the broadcast message to be sent; and
    generating the receiver queue corresponding to the broadcast message according to the acquired applications.

* * * * *